(12) United States Patent
Seo et al.

(10) Patent No.: US 9,664,958 B2
(45) Date of Patent: May 30, 2017

(54) DISPLAY DEVICE

(71) Applicant: Samsung Display Co., Ltd., Yongin, Gyeonggi-Do (KR)

(72) Inventors: Hyunseung Seo, Anyang-si (KR); Seung Jun Jeong, Hwaseong-si (KR); Jinhwan Kim, Suwon-si (KR); Yoonkyung Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 297 days.

(21) Appl. No.: 14/474,619

(22) Filed: Sep. 2, 2014

(65) Prior Publication Data

US 2015/0205162 A1    Jul. 23, 2015

(30) Foreign Application Priority Data

Jan. 20, 2014  (KR) ........................ 10-2014-0006809

(51) Int. Cl.
*G02F 1/1335*    (2006.01)
*G02F 1/1343*    (2006.01)
(Continued)

(52) U.S. Cl.
CPC ....... *G02F 1/134309* (2013.01); *G02B 27/26* (2013.01); *G02F 1/13471* (2013.01);
(Continued)

(58) Field of Classification Search
CPC ................ G02B 27/2214; G02F 2001/133531
(Continued)

(56) References Cited

U.S. PATENT DOCUMENTS

2009/0122210 A1    5/2009    Im
2009/0153754 A1    6/2009    Jung
(Continued)

FOREIGN PATENT DOCUMENTS

JP    2010170068 A    8/2010
JP    2012220719 A    11/2012
(Continued)

OTHER PUBLICATIONS

Yeh, et al., Optics of Liquid Crystal Displays, International Standard Book No. ISBN 978-0470181768, Oct. 2009, pp. 122 (792 pages), Publisher: Wiley.

*Primary Examiner* — Thanh-Nhan P Nguyen
(74) *Attorney, Agent, or Firm* — Cantor Colburn LLP

(57) ABSTRACT

A display device includes a display panel including a display surface defined by first and second directional axes perpendicular to each other, a first polarizer disposed on the display panel and having a first optical axis parallel to the first directional axis, a liquid crystal lens including lower electrodes disposed on the first polarizer and extending in a third directional axis crossing the first directional axis, an upper electrode spaced apart from the lower electrodes, and a liquid crystal layer disposed between the lower electrodes and the upper electrode and aligned between a lower alignment axis and an upper alignment axis, and a second polarizer disposed on the liquid crystal lens and having a second optical axis parallel to the first directional axis, where the lower alignment axis is defined between the first directional axis and the third directional axis on the display surface.

18 Claims, 11 Drawing Sheets

(51) Int. Cl.
  *G02B 27/26* (2006.01)
  *G02F 1/1347* (2006.01)
  *G02F 1/29* (2006.01)
  *H04N 13/04* (2006.01)

(52) U.S. Cl.
  CPC .... *G02F 1/29* (2013.01); *G02F 2001/134381* (2013.01); *G02F 2001/294* (2013.01); *H04N 13/0404* (2013.01)

(58) Field of Classification Search
  USPC .......................................................... 349/15
  See application file for complete search history.

(56) References Cited

U.S. PATENT DOCUMENTS

| | | | |
|---|---|---|---|
| 2011/0032438 A1* | 2/2011 | Yun | ............ G02F 1/13471 349/15 |
| 2012/0120333 A1 | 5/2012 | Chen et al. | |
| 2012/0206666 A1* | 8/2012 | Jeong | ............... G02F 1/292 349/15 |
| 2013/0107174 A1 | 5/2013 | Yun et al. | |

FOREIGN PATENT DOCUMENTS

| | | | | |
|---|---|---|---|---|
| JP | 201341052 A | * | 2/2013 | ......... G02B 27/2214 |
| JP | 2013041052 A | | 2/2013 | |
| JP | 2013068758 A | | 4/2013 | |
| KR | 1020070082606 A | | 8/2007 | |
| KR | 1020110059169 A | | 6/2011 | |
| KR | 1020110077708 A | | 7/2011 | |
| KR | 1020110077709 A | | 7/2011 | |
| KR | 1020110104701 A | | 9/2011 | |
| KR | 1020120028171 A | | 3/2012 | |
| KR | 1020130046116 A | | 5/2013 | |
| KR | 1020130048070 A | | 5/2013 | |
| KR | 1020130055255 A | | 5/2013 | |

* cited by examiner

DISPLAY DEVICE

This application claims priority to Korean Patent Application No. 10-2014-0006809, filed on Jan. 20, 2014, and all the benefits accruing therefrom under 35 U.S.C. §119, the content of which in its entirety is herein incorporated by reference.

BACKGROUND

1. Field

The disclosure relates to a display device. More particularly, the disclosure relates to a display device with improved optical efficiency.

2. Description of the Related Art

In general, a display device includes a display panel and various functional members. The display device includes a liquid crystal lens to display a three-dimensional ("3D") image according to an operation mode thereof.

The liquid crystal lens includes electrodes, e.g., two groups of electrodes disposed to be spaced apart from each other, and a liquid crystal layer disposed between the two groups of electrodes. When an electric field is applied to the liquid crystal layer, an arrangement of liquid crystal molecules of the liquid crystal layer is controlled by the electric field. The liquid crystal layer has a function of a lenticular lens or a Fresnel zone plate lens in accordance with a variation in arrangement of the liquid crystal molecules of the liquid crystal layer. In addition, the display device may further include various optical members.

SUMMARY

Exemplary embodiments of the invention provide a display device with improved brightness and improved visibility.

An exemplary embodiment of the invention provides a display device including: a display panel including a display surface defined by a first directional axis and a second directional axis substantially perpendicular to the first directional axis; a first polarizer disposed on the display panel and having a first optical axis substantially parallel to the first directional axis; a liquid crystal lens including a plurality of lower electrodes disposed on the first polarizer and extending in a direction substantially parallel to a third directional axis crossing the first directional axis, an upper electrode spaced apart from the lower electrodes, and a liquid crystal layer disposed between the lower electrodes and the upper electrode and aligned between a lower alignment axis and an upper alignment axis; and a second polarizer disposed on the liquid crystal lens and having a second optical axis substantially parallel to the first directional axis, where the lower alignment axis is defined between the first directional axis and the third directional axis on the display surface.

In an exemplary embodiment, a first acute angle between the first directional axis and the third directional axis may be in a range from about 5 degrees to about 9 degrees.

In an exemplary embodiment, a second acute angle between the first directional axis and the lower alignment axis may be about ½ of the first acute angle, and the lower alignment axis may be defined on the lower electrode.

In an exemplary embodiment, a second acute angle between the first directional axis and the lower alignment axis may be in a range from about 2/7 to about 5/7 of the first acute angle.

In an exemplary embodiment, the upper alignment axis may be substantially parallel to the first directional axis, and the upper alignment axis may be defined on the upper electrode.

In an exemplary embodiment, the liquid crystal layer may include liquid crystal molecules twist-aligned between the lower alignment axis and the upper alignment axis.

In an exemplary embodiment, a third acute angle between the first directional axis and the upper alignment axis may be in a range from about 2/7 to about 5/7 of the first acute angle.

In an exemplary embodiment, the upper alignment axis may be substantially parallel to the lower alignment axis.

In an exemplary embodiment, the display device may further include a third polarizer disposed opposite to the first polarizer such that the display panel is disposed between the first and third polarizers, where the third polarizer may have a third optical axis.

In an exemplary embodiment, the third optical axis may be substantially perpendicular to or substantially parallel to the first optical axis.

In an exemplary embodiment, the display panel may further include a plurality of pixel columns extending in the first directional axis and arranged in the second directional axis, and each of the pixel columns may include a plurality of pixels arranged in the first directional axis.

In an exemplary embodiment, each of the pixels may include a liquid crystal capacitor.

Another exemplary embodiment of the invention provides a display device including: a display panel including a display surface defined by a first directional axis and a second directional axis substantially perpendicular to the first directional axis; a first polarizer disposed on the display panel and having a first optical axis substantially parallel to the first directional axis; a liquid crystal lens including a plurality of lens units which is disposed on the first polarizer and extends in a third directional axis crossing the first directional axis, where the liquid crystal lens is configured to provide a multi-viewpoint image to first and second focuses different from each other in a three-dimensional mode; and a second polarizer disposed on the liquid crystal lens and having a second optical axis substantially parallel to the first directional axis, where each of the lens units includes a lower electrode extending substantially parallel to the third directional axis, an upper electrode spaced apart from the lower electrode, and liquid crystal molecules aligned between a lower alignment axis defined on the lower electrode and an upper alignment axis defined on the upper electrode, where the lower alignment axis is defined between the first directional axis and the third directional axis on the display surface.

According to exemplary embodiments described herein, the display device includes the polarizers having substantially the same optical axis as each other. Therefore, the manufacturing cost of the display device is reduced compared to a conventional display device including polarizers having different optical axes from each other.

In such embodiments, the lower alignment axis is disposed between the first optical axis and the third directional axis in which the lower electrodes extend, such that the light loss occurring in the liquid crystal lens may be reduced, and the diffract ion efficiency of the liquid crystal lens may be effectively prevented from being lowered.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
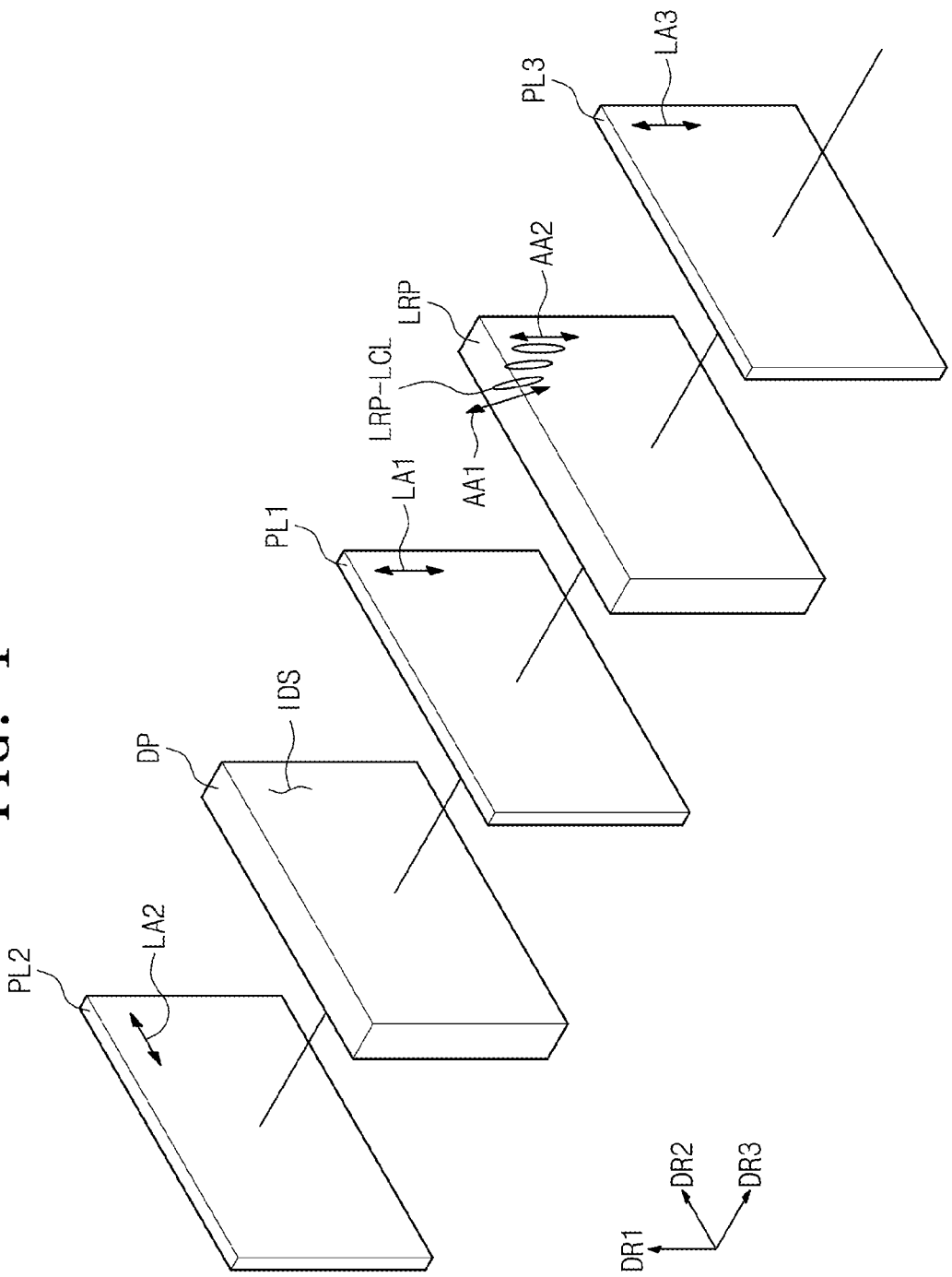
FIG. 1 is an exploded perspective view of an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms, including "at least one,", unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded.

Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
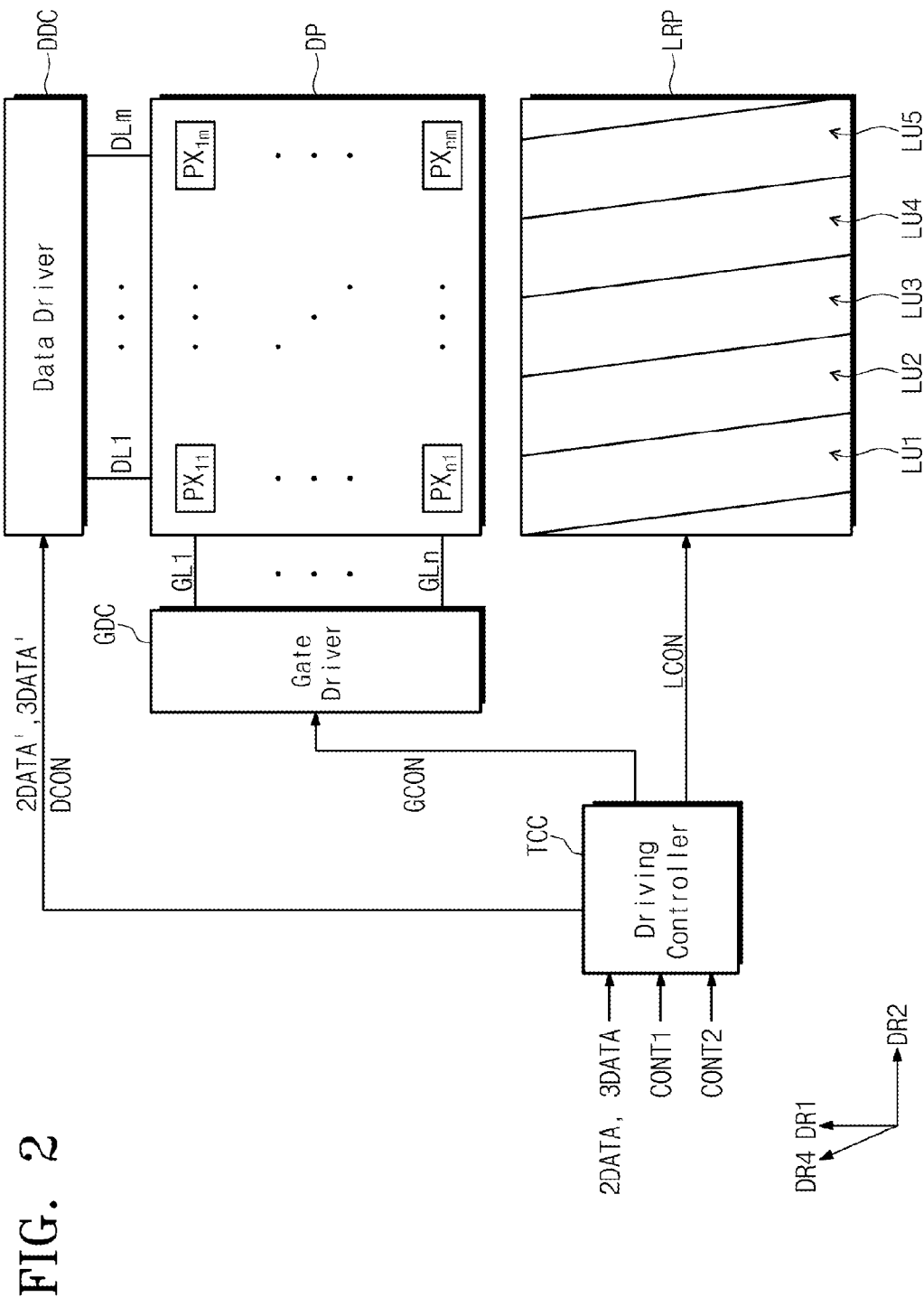
FIG. 2 is a block diagram showing an exemplary embodiment of a display device according to the invention.

FIG. 1 is an exploded perspective view of an exemplary embodiment of a display device according to the invention, and FIG. 2 is a block diagram showing an exemplary embodiment of a display device according to the invention.

Referring to FIG. 1, an exemplary embodiment of the display device includes a display panel DP for displaying an image, a liquid crystal lens LRP, and a plurality of polarizers PL1, PL2 and PL3. The display device may be, but not limited to, a transmissive display device that displays the image using a light provided from a light source (not shown). The number of the polarizers is determined based on a type of the display device. In an exemplary embodiment, as shown in FIG. 1, the display device may include first, second and third polarizers PL1, PL2, and PL3.

The display panel DP includes a display surface IDS defined by a first directional axis DR1 and a second directional axis DR2 substantially perpendicular to the first directional axis DR1. The display panel DP displays a two-dimensional ("2D") image in a 2D mode and displays a three-dimensional ("3D") image in a 3D mode. The 3D image may be a multi-viewpoint image.

In an exemplary embodiment, the display panel DP may be, but not limited to, a liquid crystal display panel including two substrates and a liquid crystal layer disposed between the two substrates. The configuration of the liquid crystal display panel is determined based on an alignment mode of liquid crystal molecules of the liquid crystal layer. The liquid crystal display panel may be a vertical alignment ("VA") mode liquid crystal display panel, a patterned vertical alignment ("PVA") mode liquid crystal display panel, a twisted nematic ("TN") mode liquid crystal display panel, an in-plane switching ("IPS") mode liquid crystal display panel, a fringe-field switching ("FFS") mode liquid crystal display panel, or a plane to line switching ("PLS") mode liquid crystal display panel, for example.

The liquid crystal lens LRP is disposed to be spaced apart from the display panel DP. The liquid crystal lens LRP is spaced apart from the display panel DP in a normal line with respect to the display surface IDS, which is indicated by a third directional axis DR3. In an exemplary embodiment, a distance control member (not shown) may be disposed between the liquid crystal lens LRP and the display panel DP. The distance control member may control a focal length between lens units LU1 to LU5 (refer to FIG. 2) and pixel columns of the display panel DP.

In an exemplary embodiment, the liquid crystal lens LRP transmits the 2D image in the 2D mode without changing a phase of the 2D image and provides the 3D image to a plurality of focuses, e.g., first and second focuses, which are different from each other. In such an embodiment, the liquid crystal lens LRP separates the multi-viewpoint image to different focuses using diffraction phenomenon therein. The first and second focuses may be controlled to correspond to left and right eyes of a user, respectively, and positions of the first and second focuses may be determined based on a distance between the display device and the user. The liquid crystal lens LRP may provide the 3D image to a plurality of first focuses and a plurality of second focuses based on left and right eye positions of the user with respect to the display device.

In such an embodiment, the liquid crystal lens LRP includes a liquid crystal layer LRP-LCL disposed between two substrates (not shown) disposed to be spaced apart from each other. Liquid crystal molecules of the liquid crystal layer LRP-LCL are aligned along a lower alignment axis AA1 and an upper alignment axis AA2, which are respectively defined in the two substrates. When the electric field is applied to the liquid crystal layer LRP-LCL, the arrangement of the liquid crystal molecules of the liquid crystal layer LRP-LCL is changed such that the liquid crystal layer LRP-LCL functions as a lenticular lens or a Fresnel zone plate lens.

The first polarizer PL1 and the second polarizer PL2 are disposed opposite to each other, and the display panel DP is disposed between the first polarizer PL1 and the second polarizer PL2. The first and second polarizers PL1 and PL2 transmit or block the light incident thereto and provided from the light source in accordance with the arrangement of the liquid crystal molecules of the display panel DP. The third polarizer PL3 is disposed on the liquid crystal lens LRP and polarizes the multi-viewpoint image.

Although not shown in figures, in such an embodiment, another functional member may be further disposed between the display panel DP, the liquid crystal lens LRP, and the first, second and third polarizers PL1, PL2 and PL3.

The first, second and third polarizers PL1, PL2 and PL3 have optical axes LA1, LA2 and LA3 (hereinafter, referred to as transmission axes), respectively, to transmit the light to a predetermined direction. Each of the first, second and third polarizers PL1, PL2 and PL3 may have a block axis substantially perpendicular to the transmission axis thereof.

Each of the first, second and third polarizers PL1, PL2 and PL3 may be formed by, after allowing iodine compound or dichroic polarizing material to be absorbed onto a polyvinyl alcohol-based polarizing film, drawing the polyvinyl alcohol-based polarizing film in along an elongation direction. Each of the first, second and third polarizers PL1, PL2 and PL3 may further include a triacetylcellulose protective film to protect a polarizing film therein. In an exemplary embodiment, each of the first, second and third polarizers PL1, PL2 and PL3 may be an optical member including a liquid crystal layer cured after being aligned in a specific direction.

Hereinafter, an exemplary embodiment of a driving method of the display device will be described in detail with reference to FIG. 2.

Referring to FIG. 2, the display device includes a driving controller TCC to control an operation of the display panel DP, a gate driver GDC, and a data driver DDC.

The display panel DP includes a plurality of gate lines GL1 to GLn and a plurality of data lines DL1 to DLm crossing the gate lines GL1 to GLn. The data lines DL1 to DLm extend substantially in a direction of the first directional axis DR1 and are arranged in a direction of the second directional axis DR2. Herein, n and m are natural numbers. In such an embodiment, the display panel DP includes a plurality of pixels PX11 to PXnm arranged substantially in a matrix form.

Each of the pixels PX11 to PXnm is connected to a corresponding gate line of the gate lines GL1 to GLn and a corresponding data line of the data lines DL1 to DLm. The pixels PX11 to PXnm may be divided into a plurality of pixel columns extending in the direction of the first directional axis DR1. The pixels PX11 to PXnm may be divided into m pixel columns. Each of the lens units of the lens units LI1 to LU5 may overlap some of (e.g., a predetermined number of) the m pixel columns.

The driving controller TCC receives image signals 2DATA and 3DATA. The image signals 2DATA and 3DATA include a 2D image signal 2DATA or a 3D image signal 3DATA. When the display device operates in the 2D mode, the driving controller TCC receives a first control signal CONT1, and when the display device operates in the 3D mode, the driving controller TCC receives a second control signal CONT2. Each of the first and second control signals CONT1 and CONT2 includes various signals, e.g., a horizontal synchronization signal, a vertical synchronization signal, a main clock signal, and a data enable signal, etc., which correspond to each operation mode.

The driving controller TCC converts a data format of the image signals 2DATA and 3DATA to a data format appropriate to interface between the data driver DDC and the driving controller TCC, and applies the converted image signals 2DATA' and 3DATA' to the data driver DCC. The driving controller TCC applies a data control signal DCON, such as an output start signal, a horizontal start signal, a horizontal clock signal, a polarity inversion signal, etc., to the data driver DDC, and applies a gate control signal GCON, such as a vertical start signal, a vertical clock signal, a vertical clock bar signal, etc., to the gate driver GDC.

The gate driver GDC sequentially applies gate signals to the gate lines GL1 to GLn. The data driver DDC outputs data signals based on the converted image signals 2DATA' and 3DATA' in response to the data control signal DCON.

The driving controller TCC applies a liquid crystal lens control signal LCON to the liquid crystal lens LRP. The liquid crystal lens LRP is turned on or off in response to the liquid crystal lens control signal LCON. The liquid crystal lens LRP applies the electric field to the liquid crystal layer LRP-LCL based on the liquid crystal lens control signal LCON. When the electric field is applied to the liquid crystal layer LRP-LCL, the lens units LU1 to LU5 are defined in the liquid crystal lens LRP. In one exemplary embodiment, for example, five lens units LU1 to LU5 may be defined in the liquid crystal lens LRP as shown in FIG. 2.

Each of the lens units LU1 to LU5 extends substantially in a direction of a fourth directional axis DR4 crossing the first directional axis DR1 in which the data lines DL1 to DLm or the pixel columns extend. The fourth directional axis DR4 is a direction in which a plurality of lower electrodes included in the liquid crystal lens LRP extend. The fourth directional axis DR4 forms an acute angle with the first directional axis DR1.

Figure 3:
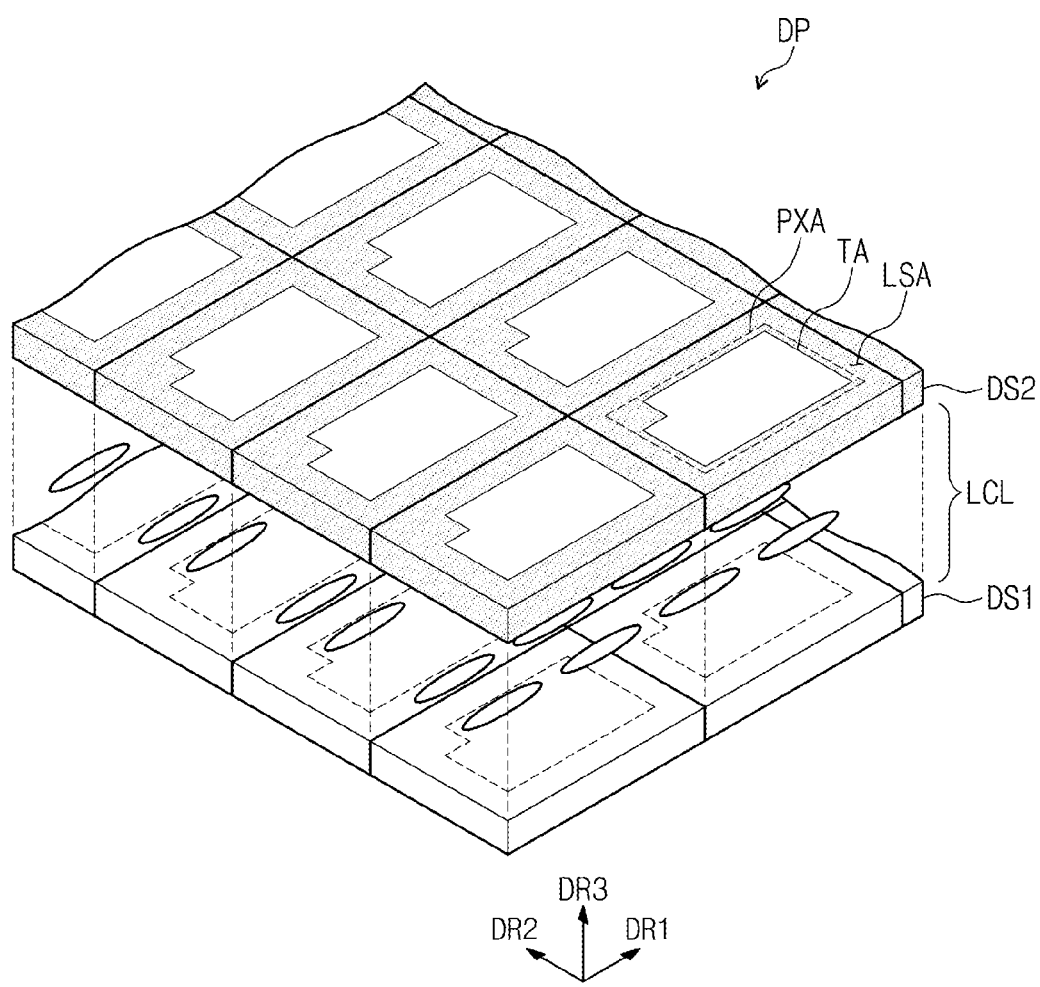
FIG. 3 is a perspective view of an exemplary embodiment of a display panel according to the invention.
Figure 4:
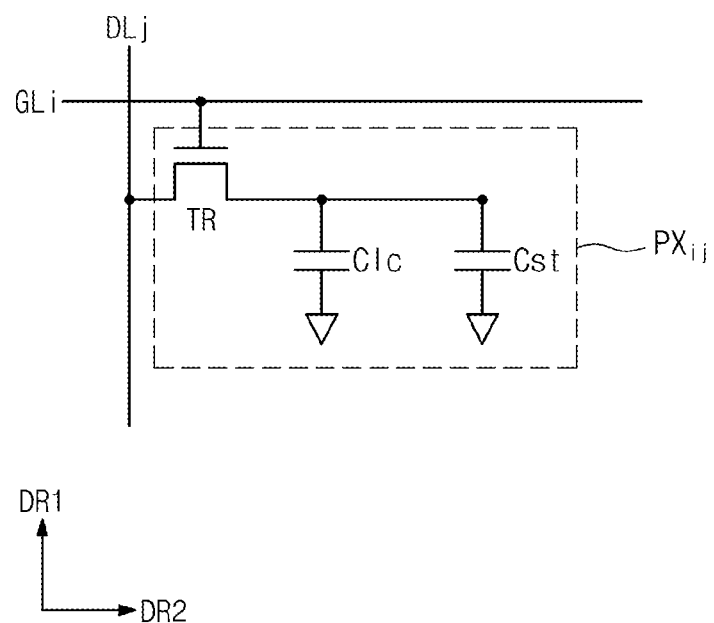
FIG. 4 is an equivalent circuit diagram showing an exemplary embodiment of a pixel according to the invention.
Figure 5:
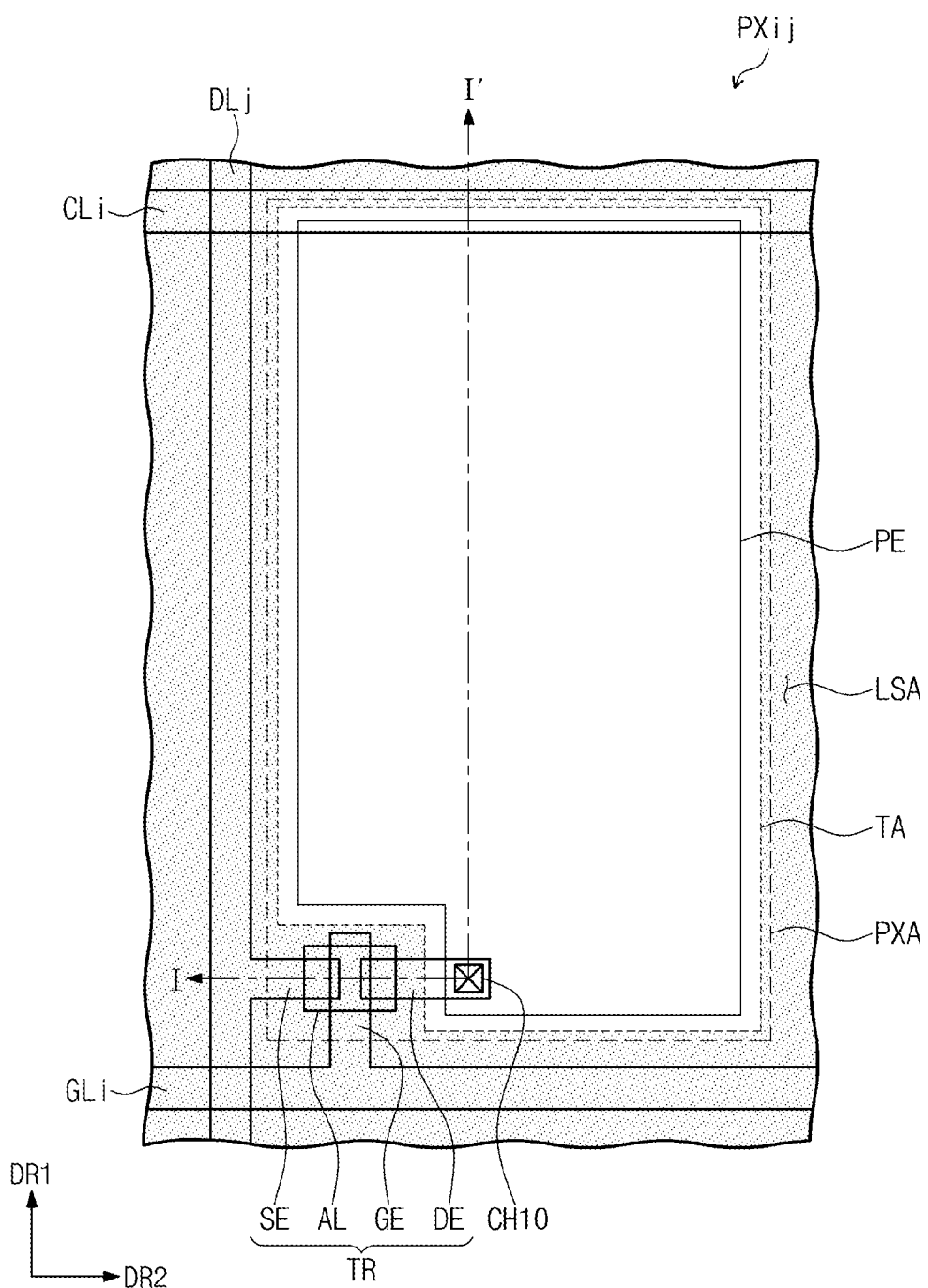
FIG. 5 is a plan view of an exemplary embodiment of a pixel according to the invention.
Figure 6:
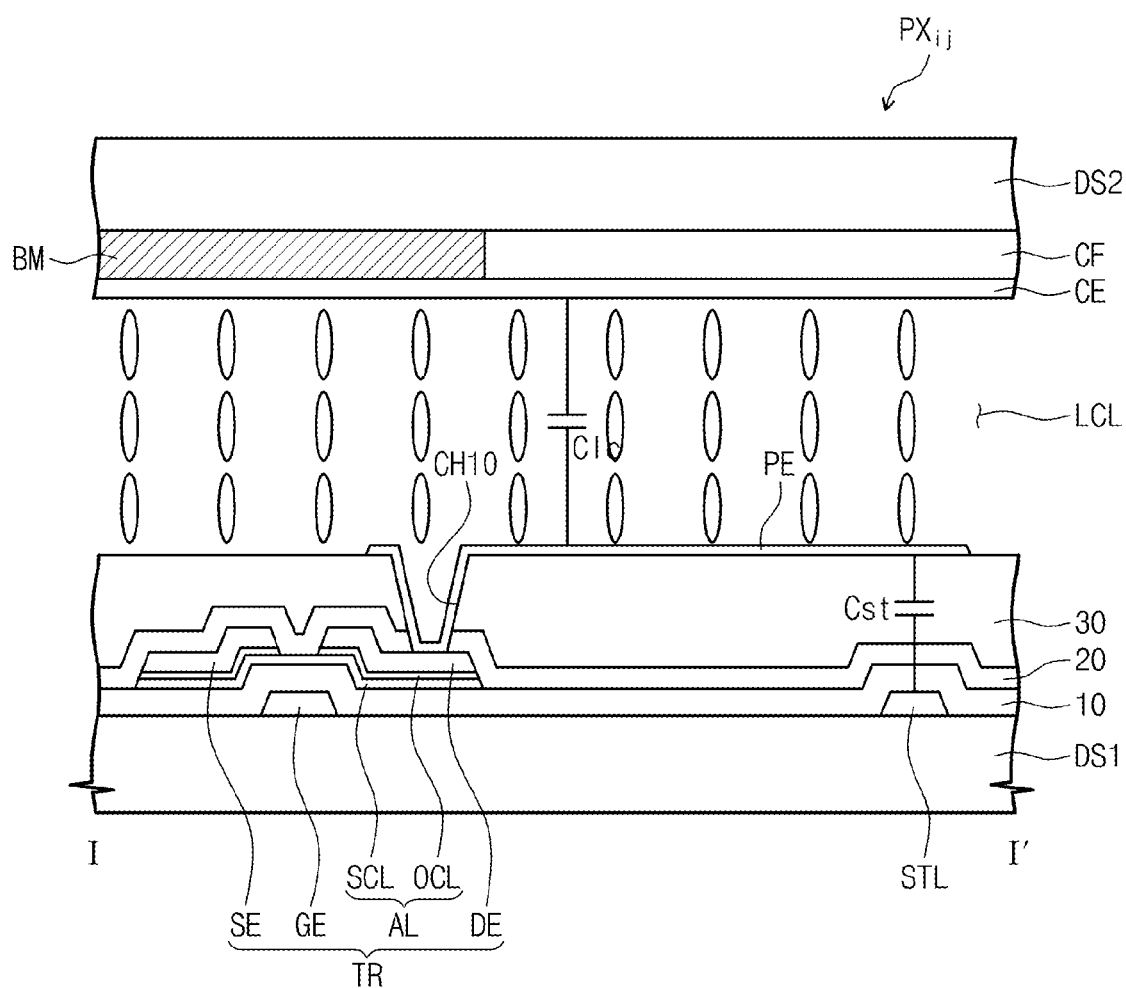
FIG. 6 is a cross-sectional view taken along line I-I' of the pixel shown in FIG. 5.

FIG. 3 is a perspective view of an exemplary embodiment of a display panel according to the invention, FIG. 4 is an equivalent circuit diagram showing an exemplary embodiment of a pixel according to the invention, FIG. 5 is a plan view of an exemplary embodiment of a pixel according to the invention, and FIG. 6 is a cross-sectional view taken along line I-I' of the pixel shown in FIG. 5. Each of the pixels PX11 to PXnm shown in FIG. 2 may have the equivalent circuit shown in FIG. 4.

Referring to FIG. 3, an exemplary embodiment of the display panel DP includes a first display substrate DS1 and a second display substrate DS2. The first display substrate DS1 and the second display substrate DS2 are disposed opposite to each other and spaced apart from each other in the third directional axis DR3. The liquid crystal layer LCL is disposed between the first display substrate DS1 and the second display substrate DS2.

The display panel DP includes display areas TA to display the image and a non-display area LSA adjacent to the display areas TA. The display areas TA transmit the light from the light source (not shown). The non-display area LSA overlaps a black matrix BM (refer to FIG. 6). A color filter CF (refer to FIG. 6) is disposed to overlap the display areas TA.

A pixel area PXA may be defined by a display area TA and thin film transistor, and the pixel area PXA may be wider than the display area TA corresponding thereto by an area of the thin film transistor. The pixels PX11 to PXnm are disposed to correspond to the pixel area PXA. The gate lines GL1 to GLn and the data lines DL1 to DLm are disposed in the non-display area LSA.

Referring to FIG. 4, the pixel PXij, which is in an i-th row and a j-th column, includes a thin film transistor TR, a liquid crystal capacitor Clc and a storage capacitor Cst. The thin film transistor TR is electrically connected to an i-th gate line GLi and a j-th data line DLj. The thin film transistor TR outputs a pixel voltage corresponding to the data signal provided through the j-th data line DLj in response to the gate signal provided through the i-th gate line GLi.

The liquid crystal capacitor Clc is charged with the pixel voltage output from the thin film transistor TR. An arrangement of liquid crystal directors in a portion of the liquid crystal layer LCL (refer to FIG. 3) corresponding to the pixel PXij is changed in accordance with an amount of electric charges charged in the liquid crystal capacitor Clc. The light incident to the liquid crystal layer transmits through or is blocked by the liquid crystal layer according to the arrangement of the liquid crystal directors.

The storage capacitor Cst is connected to the liquid crystal capacitor Clc in parallel. The storage capacitor Cst allows the arrangement of the liquid crystal directors to be maintained for a predetermined period.

Referring to FIGS. 5 and 6, the thin film transistor TR includes a control electrode GE connected to the i-th gate line GLi, an active part AL that overlaps the control electrode GE, an input electrode SE connected to the j-th data line DLj (refer to FIG. 3), and an output electrode DE spaced apart from the input electrode SE.

The liquid crystal capacitor Clc is defined by a pixel electrode PE and a common electrode CE. The storage capacitor Cst is defined by the pixel electrode PE and a portion of a storage line STL, which overlaps the pixel electrode PE.

The i-th gate line GLi and the storage line STL are disposed on a surface of the first display substrate DS1. The control electrode GE is branched from the i-th gate line GLi. The i-th gate line GLi and the storage line STL may include a metal material, e.g., aluminum (Al), silver (Ag), copper (Cu), molybdenum (Mo), chromium (Cr), tantalum (Ta), titanium (Ti), etc., or an alloy thereof. Each of the i-th gate line GLi and the storage line STL may have a multi-layer structure including a titanium layer and a copper layer.

A first insulating layer 10 is disposed on a surface of the first display substrate DS1 to cover the control electrode GE and the storage line STL. The first insulating layer 10 may include at least one of an inorganic material and an organic material. The first insulating layer 10 may be an organic or inorganic layer. The first insulating layer 10 may have a multi-layer structure including a silicon nitride layer and a silicon oxide layer.

The active part AL is disposed on the first insulating layer 10 to overlap the control electrode GE. The active part AL may include a semiconductor layer SCL and an ohmic contact layer OCL. The semiconductor layer SCL is disposed on the first insulating layer 10 and the ohmic contact layer OCL is disposed on the semiconductor layer SCL.

The semiconductor layer SCL may include amorphous silicon or poly silicon. In an exemplary embodiment, the semiconductor layer SCL includes a metal oxide semiconductor layer. The ohmic contact layer OCL may be doped with a dopant at a higher concentration than that of the semiconductor layer. In an exemplary embodiment, the ohmic contact layer OCL includes two portions separated (e.g., spaced apart) from each other. In an alternative exemplary embodiment, the ohmic contact layer OCL may be integrally formed as a single unitary and individual unit.

The output electrode DE and the input electrode SE are disposed on the active part AL. The output electrode DE and the input electrode SE are spaced apart from each other. Each of the output electrode DE and the input electrode SE may partially overlap the control electrode GE.

In an exemplary embodiment, the output electrode DE and the input electrode SE are disposed on the ohmic contact layer OCL. In an exemplary embodiment, where the ohmic contact layer OCL includes two portions, the output electrode DE may completely overlap one portion of the ohmic contact layer OCL and the input electrode SE may completely overlap the other portion of the ohmic contact layer OCL, when viewed in a plan view.

A second insulating layer 20 is disposed on the first insulating layer 10 to cover the active part AL, the output electrode DE and the input electrode SE. The second insulating layer 20 may include at least one of an inorganic material and an organic material. The second insulating layer 20 may be an organic layer or an inorganic layer. The second insulating layer 20 may have a multi-layer structure including a silicon nitride layer and a silicon oxide layer.

FIG. 6 shows an exemplary embodiment of a pixel including the thin film transistor TR having a staggered structure, but the structure of the thin film transistor TR should not be limited to the staggered structure. In one alternative exemplary embodiment, for example, the thin film transistor TR may have a planar structure.

In an exemplary embodiment, a third insulating layer 30 is disposed on the second insulating layer 20. The third insulating layer 30 provides a planarized surface.

The third insulating layer 30 may include an organic material.

The pixel electrode PE is disposed on the third insulating layer 30. The pixel electrode PE is connected to the output electrode DE through a contact hole CH10 defined through the second insulating layer 20 and the third insulating layer 30. The pixel may further include an alignment layer (not shown) disposed on the third insulating layer 30 to cover the pixel electrode PE.

The color filter CF and the black matrix BM are disposed on a surface of the second display substrate DS2. The common electrode CE is disposed on the color filter CF and the black matrix BM. The common electrode CE is applied with a common voltage. The common voltage has a value (e.g., a voltage level) different from a value of the pixel voltage. The pixel may further include an alignment layer (not shown) disposed on the common electrode CE to cover the common electrode CE.

In an exemplary embodiment, another insulating layer (not shown) may be disposed between the color filter CF and the common electrode CE and between the black matrix BM and the common electrode CE.

The pixel electrode PE, the common electrode CE, and the liquid crystal layer LCL disposed between the pixel electrode PE and the common electrode CE form or collectively define the liquid crystal capacitor Clc. The pixel electrode PE, the port ion of the storage line STL, and the first, second and third insulating layers 10, 20 and 30 disposed between the pixel electrode PE and the portion of the storage line STL form the storage capacitor Cst. The storage line STL receives a storage voltage having a value different from the value of the pixel voltage. The storage voltage may have the same value as the value of the common voltage.

Figure 7:
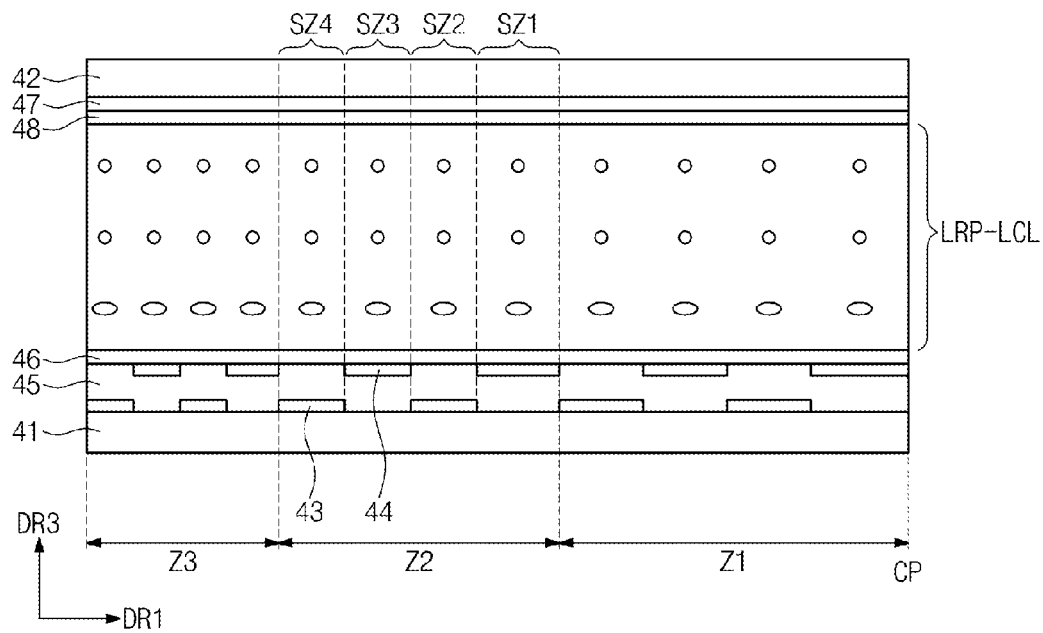
FIG. 7 is a cross-sectional view of an exemplary embodiment of a liquid crystal lens in a two-dimensional mode, according to the invention.

FIG. 7 is a cross-sectional view of an exemplary embodiment of a liquid crystal lens operated in the 2D mode, according to the invention. FIG. 7 shows a portion of the cross-sectional view taken along the second directional axis DR2 (refer to FIGS. 1 and 2) of the liquid crystal lens LRP.

The liquid crystal lens LRP includes lower electrodes 43 and 44 disposed on a lower substrate 41, an upper electrode 47 disposed on an upper substrate 42 spaced apart from the lower substrate 41, and the liquid crystal layer LRP-LCL disposed between the lower electrodes 43 and 44 and the upper electrode 47.

The lower substrate 41 and the upper substrate 42 may define a portion of the liquid crystal lens LRP or a portion of another optical member. Each of the lower substrate 41 and the upper substrate 42 may be a glass substrate or a transparent plastic substrate, for example.

The lower electrodes 43 and 44 include first lower electrodes 43 disposed on the lower substrate 41 and second lower electrodes 44 disposed on an insulating layer 45 that covers the first lower electrodes 43. In an exemplary embodiment, as shown in FIG. 7, the first lower electrodes 43 may not overlap the second lower electrodes 44, but not being limited thereto or thereby. In an alternative exemplary embodiment, edges of the first lower electrodes 43 may overlap edges of the second lower electrodes 44. In another alternative exemplary embodiment, either the first lower electrodes 43 or the second lower electrodes 44 may be omitted.

Each of the first lower electrodes 43 and each of the second lower electrodes 44 may have a bar shape extending in the fourth directional axis DR4 (refer to FIG. 2). The upper electrode 47 overlaps the first lower electrodes 43 and the second lower electrodes 44. The upper electrode 47 may be disposed over an entire surface of the upper substrate 42. The upper electrode 47 may be integrally formed as a single unitary and individual unit.

The lower alignment axis AA1 (refer to FIG. 1) and the upper alignment axis AA2 (refer to FIG. 1) are defined between the lower electrodes 43 and 44 and the upper electrode 47. The lower alignment axis AA1 is defined by a lower alignment layer 46 that covers the lower electrodes 43 and 44. The upper alignment axis AA2 is defined by an upper alignment layer 48 that covers the upper electrode 47.

The lower alignment layer 46 and the upper alignment layer 48 may be polyimide layers rubbed in a same direction as each other or different directions from each other. The lower alignment axis AA1 and the upper alignment axis AA2 are defined by the rubbing direction of the lower alignment layer 46 and the upper alignment layer 48, respectively. The lower alignment axis AA1 and the upper alignment axis AA2 may be defined to form a predetermined acute angle with each other.

According to another exemplary embodiment, the lower alignment axis AA1 and the upper alignment axis AA2 may be defined to be substantially parallel to each other. In such an embodiment, the rubbing direction of the lower alignment axis AA1 is substantially the same as or opposite to the rubbing direction of the upper alignment axis AA2. In an exemplary embodiment, the liquid crystal layer LRP-LCL may be light-aligned. In such an embodiment, the rubbing direction of the lower alignment axis AA1 and the upper alignment axis AA2 are determined by the direction in which a light beam is irradiated The liquid crystal molecules included in the liquid crystal layer LRP-LCL are horizontally aligned between the lower alignment axis AA1 and the upper alignment axis AA2. Among the liquid crystal molecules, a liquid crystal molecule disposed adjacent to the lower alignment axis AA1 has a longitudinal axis substantially parallel to the lower alignment axis AA1, and a liquid crystal molecule disposed adjacent to the upper alignment axis AA2 has a longitudinal axis substantially parallel to the upper alignment axis AA2. The liquid crystal molecules may be twist aligned based on the acute angle between the lower alignment axis AA1 and the upper alignment axis AA2.

When the liquid crystal lens is in the 2D mode, the lower electrodes 43 and 44 and the upper electrode 47 receive a first driving voltage. The level of the voltage applied to the lower electrodes 43 and 44 is substantially the same as the level of the voltage applied to the upper electrode 47, such that the lower electrodes 43 and 44 and the upper electrode 47 have the same electric potential as each other in the 2D mode. Accordingly, the arrangement of the liquid crystal molecules included in the liquid crystal layer LRP-LCL is not changed from an initial alignment state.

The liquid crystal layer LRP-LCL, in which the initial alignment state of the liquid crystal molecules is maintained, does not delay the phase of the light passing therethrough or uniformly delays the light passing therethrough in all areas thereof. Accordingly, when the liquid crystal layer LRP-LCL maintains the initial alignment state, the lens units are not formed or defined therein.

Figure 8:
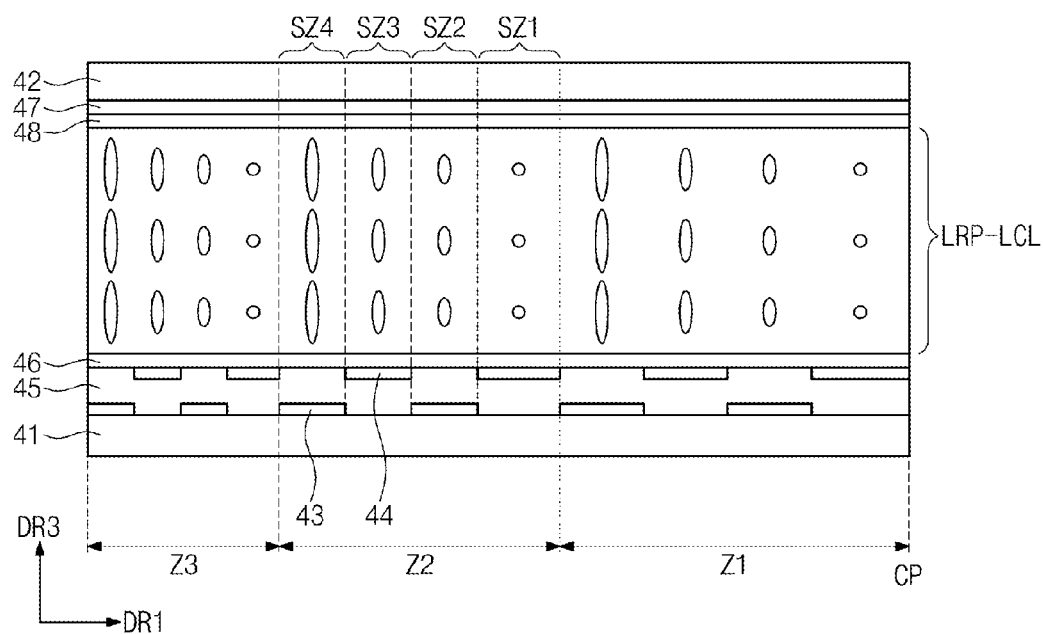
FIG. 8 is a cross-sectional view of an exemplary embodiment of a liquid crystal lens in a three-dimensional mode, according to the invention.
Figure 9:
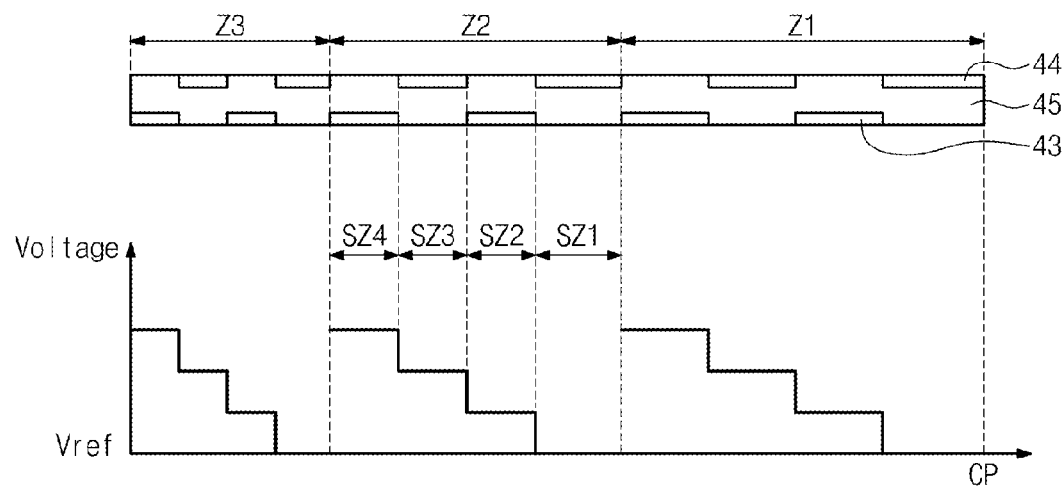
FIG. 9 is a graph showing a voltage applied to the liquid crystal lens shown in FIG. 8, which operates in the three-dimensional mode.
Figure 10:
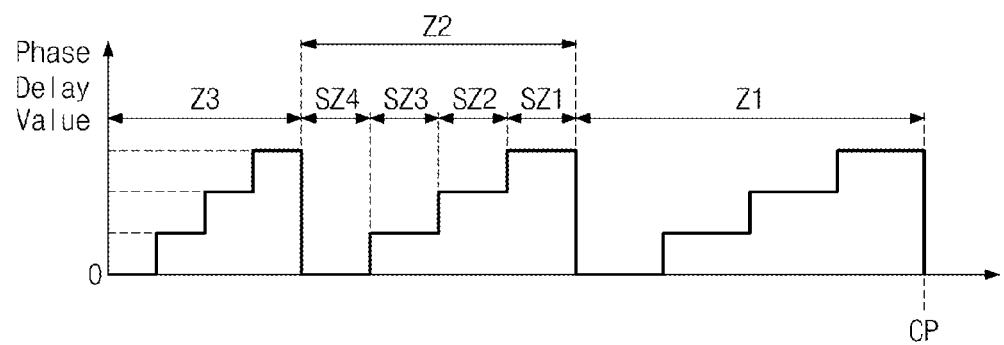
FIG. 10 is a graph showing a phase delay of the liquid crystal lens of FIG. 8, which corresponds to a voltage graph shown in FIG. 9.
Figure 11:
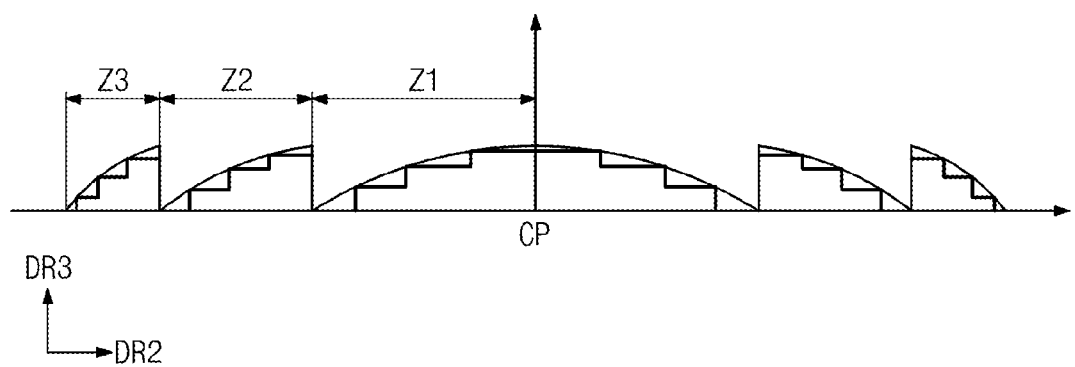
FIG. 11 is a graph showing a phase delay in an exemplary embodiment of a lens unit according to the invention.

FIG. 8 is a cross-sectional view showing an exemplary embodiment of a liquid crystal lens in a three-dimensional mode, according to the invention, FIG. 9 is a graph showing a voltage applied to the liquid crystal lens of FIG. 8, which is in the three-dimensional mode, FIG. 10 is a graph showing a phase delay of the liquid crystal lens, which corresponds to a voltage graph shown in FIG. 9, and FIG. 11 is a graph showing a phase delay in an exemplary embodiment of a lens unit according to the invention.

FIG. 8 shows a portion of the cross-sectional view of the liquid crystal lens LRP corresponding to FIG. 7. The liquid crystal lens LRP in the 3D mode includes lens units LU1 to LU5 (refer to FIG. 1) defined by applying a second driving voltage. FIG. 8 corresponds to a portion of one lens unit of the lens units LU1 to LU5.

The lens unit includes a plurality of areas Z1, Z2 and Z3 distinct from each other along the second directional axis DR2. In one exemplary embodiment, for example, three areas are arranged in opposing directions (e.g., left and right directions) from a center CP of the second directional axis DR2 of the lens unit. FIG. 8 shows the three areas Z1, Z2 and Z3 arranged in the left direction from the center CP of the second directional axis DR2 of the lens unit.

In an exemplary embodiment, the number of the first lower electrodes 43 and the number of the second lower electrodes 44 included in each of the areas Z1, Z2 and Z3 are the same as each other. A width in the second directional axis DR2 of the first lower electrodes 43 becomes smaller as the first lower electrodes 43 goes away from the center CP along the left direction. A width in the second directional axis DR2 of the second lower electrodes 44 becomes smaller as the second lower electrodes 44 goes away from the center CP along the left direction. According to another exemplary embodiment, the width in the second directional axis DR2 of the electrodes disposed in the areas Z1, Z2 and Z3 may be constant.

Each of the areas Z1, Z2 and Z3 includes a plurality of sub-areas, e.g., a first sub-area SZ1, a second sub-area SZ2, a third sub-area SZ3 and a fourth sub-area SZ4, distinct from each other and sequentially arranged along the second directional axis DR2. The sub-areas SZ1, SZ2, SZ3 and SZ4 are defined to correspond to the first lower electrodes 43 and the second lower electrodes 44 in each of the areas Z1, Z2 and Z3.

Referring to FIG. 9, in such an embodiment, the lower electrodes 43 and 44 included in the sub-areas SZ1, SZ2, SZ3 and SZ4 are applied with a step-shaped voltage. The step-shaped voltage has a level that becomes higher as it goes to the left direction from the right direction in each of the areas Z1, Z2 and Z3. Referring to the second area Z2 among the areas Z1, Z2 and Z3, the electrode of the first sub-area SZ1 disposed at a rightmost position receives the voltage having the lowest level, and the electrode of the fourth sub-area SZ4 disposed at a leftmost position receives the voltage having the highest level. The upper electrode 47 receives the common voltage.

In such an embodiment, the electrodes disposed in corresponding sub-areas of the areas Z1, Z2, and Z3 receive the voltage having the same level. In an exemplary embodiment, the electrode disposed in a sub-area, e.g., the fourth sub-area SZ4, of the first area Z1 receives the voltage having a predetermined level which is applied to the electrodes disposed in the corresponding sub-area, e.g., the fourth sub-areas SZ4, of the second and third areas Z2 and Z3. In such an embodiment, the electrodes disposed in corresponding sub-areas of the areas Z1, Z2, and Z3 may receive the voltage having the level that becomes lower as it goes to the left direction.

The electrodes disposed in the first sub-areas SZ1 of the areas Z1, Z2, and Z3 receive the voltage having substantially the same level as the voltage applied to the upper electrode 47. The electrodes of the first sub-areas SZ1 receive a reference voltage Vref, and the reference voltage Vref has substantially the same level as the level of the common voltage.

As shown in FIG. 8, the arrangement of the liquid crystal molecules is changed in accordance with the electric field formed in the areas Z1, Z2 and Z3. The liquid crystal molecules included in the sub-areas SZ1, SZ2, SZ3 and SZ4 are aligned substantially vertically as they go to the left direction. The arrangement of the liquid crystal molecules disposed in the first sub-area SZ1 in each of the areas Z1, Z2 and Z3 is not changed.

In an exemplary embodiment, referring to the second area Z2, the liquid crystal molecules are aligned approximately parallel to a vertical axis as they near to the fourth sub-area SZ4 and are far from the second sub-area SZ2. In such an embodiment, the liquid crystal molecules disposed in the corresponding sub-areas of the areas Z1, Z2 and Z3 are aligned approximately parallel to the vertical axis as they go to the left direction.

The change in arrangement of the liquid crystal molecules causes a phase delay of the light passing through the liquid crystal lens LRP. The lens unit applied with the voltage as represented by the graph in FIG. 9 transmits the light such that the light has a different phase delay value for each area as represented by the graph in FIG. 10. The phase delay graph in the second directional axis DR2 of one lens unit is as shown in FIG. 11.

Referring to FIG. 11, in an exemplary embodiment, the phase delay graph has a left-and-right symmetrical shape with respect to the center CP. In such an embodiment, the lens unit may function as a Fresnel zone plate lens. In such an embodiment, the phase delay value of each of the areas Z1, Z2 and Z3 gradually increases in the step shape, such that the lens unit may function as a multi-level phase modulation Fresnel zone plate lens.

In an exemplary embodiment, an intensity of the electric field substantially is proportional to the variation in arrangement of the liquid crystal molecules, but the intensity of the electric field may be substantially inversely proportional to the variation in arrangement of the liquid crystal molecules due to a dielectric anisotropy of the liquid crystal molecules. In such an embodiment, the variation in arrangement of the liquid crystal molecules is substantially inversely proportional to the phase delay value, but the variation in arrangement of the liquid crystal molecules may be substantially proportional to the phase delay value due to a refractive anisotropy of the liquid crystal molecules.

In an exemplary embodiment, the second driving voltage may be changed to allow the lens unit to function as the lenticular lens. In one exemplary embodiment, For instance, the voltage having the level that becomes high as it goes to the left direction, e.g., the step-shaped voltage, may be applied to the lower electrodes 43 and 44 included in the areas Z1, Z2 and Z3 in each of the areas Z1, Z2 and Z3.

Figure 12:
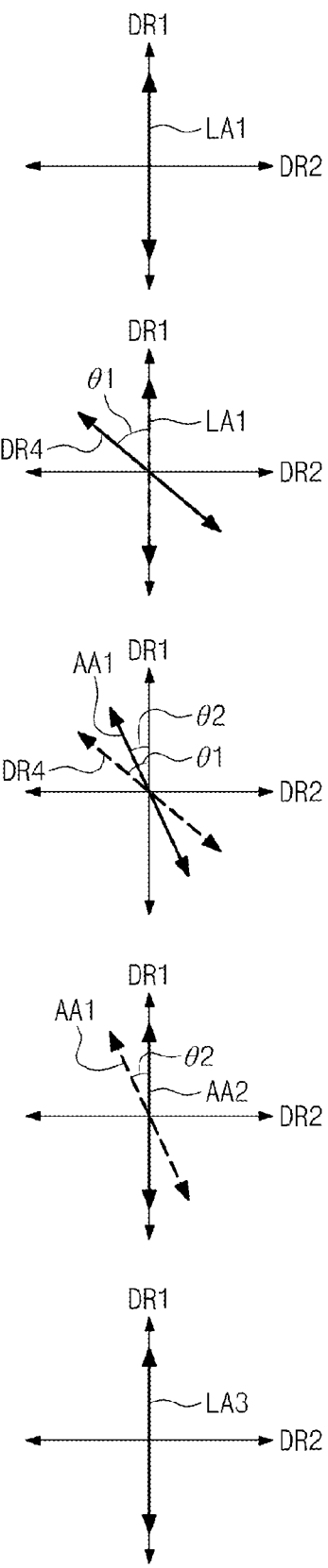
FIG. 12 is a view showing optical axes of an exemplary embodiment of a display device according to the invention.
Figure 13:
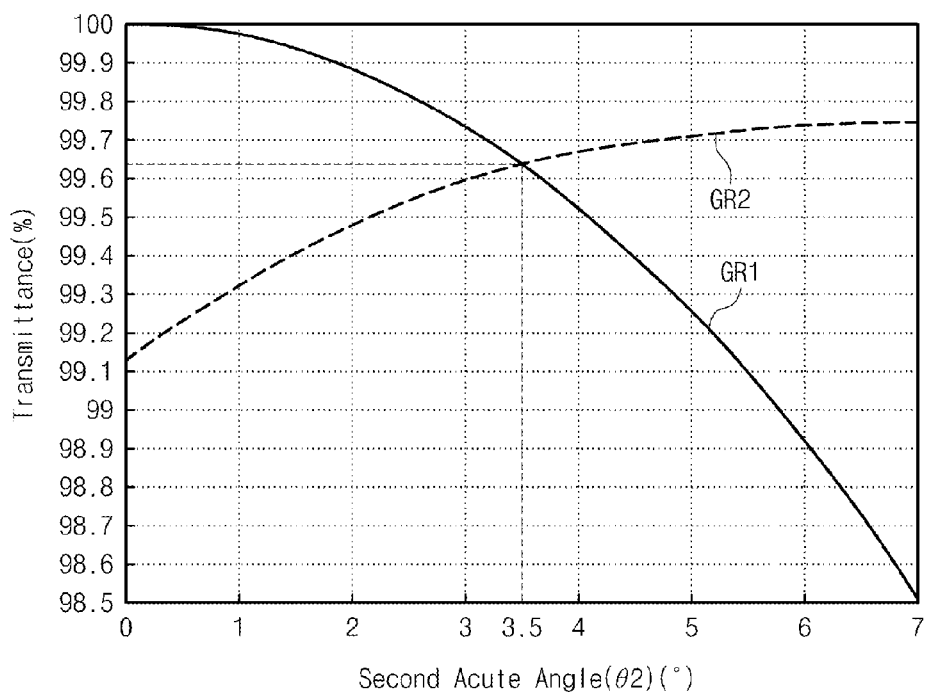
FIG. 13 is a graph showing a diffraction efficiency of an exemplary embodiment of a liquid crystal lens according to the invention.

FIG. 12 is a view showing optical axes of an exemplary embodiment of a display device according to the invention, and FIG. 13 is a graph showing a diffraction efficiency of an exemplary embodiment of a liquid crystal lens according to the invention. Hereinafter, optical axes that define the display surface IDS, e.g., the first and second directional axes DR1 and DR2 shown in FIG. 1, will be described in detail.

In an exemplary embodiment, a transmission axis LA1 (hereinafter, referred to as a first transmission axis) of the first polarizer PL1 is substantially parallel to the first directional axis DR1. The first transmission axis LA1 is substantially perpendicular to a transmission axis LA2 (hereinafter, referred to as a second transmission axis) of the second polarizer PL2.

In an exemplary embodiment, where the display panel DP is a VA mode liquid crystal display panel, the display panel DP operates in a normally black mode based on the arrangement between the first transmission axis LA1 and the second transmission axis LA2. In an alternative exemplary embodiment, where the display panel DP is a TN mode liquid crystal display panel, the display panel DP operates in a normally white mode based on the arrangement between the first transmission axis LA1 and the second transmission axis LA2. In such an embodiment, where the first transmission axis LA1 is substantially parallel to the second transmission axis LA2, the VA mode liquid crystal display panel operates in the normally white mode, and the TN mode liquid crystal display panel operates in the normally black mode. The arrangement between the first transmission axis LA1 and the second transmission axis LA2 may be variously changed based on the alignment mode and the operation mode of the display panel.

In an exemplary embodiment, a transmission axis LA3 (hereinafter, referred to as a third transmission axis) of the third polarizer PL3 is substantially parallel to the first transmission axis LA1. In such an embodiment, the third polarizer PL3 may be a same polarization member as the first polarizer PL1, that is, the same polarization member may be used as the first and third polarizer PL1 and PL3. Accordingly, in an exemplary embodiment, the display device does not need to include an additional polarizer different from the first polarizer PL1 or the second polarizer PL2 such that the manufacturing thereof may be decreased compared to a conventional display device including a polarizer having the third transmission axis that forms an acute angle together with the first transmission axis LA1 as the third polarizer.

In an exemplary embodiment, the first transmission axis LA1 forms a first acute angle θ1 with the lens units LU1 to LU5 (refer to FIG. 2) or the lower electrodes 43 and 44. In FIG. 11, a direction in which the lens units LU1 to LU5 or the lower electrodes 43 and 44 extend is represented by the fourth directional axis DR4. In an exemplary embodiment, the first acute angle θ1 may be in a range from about 5 degrees to about 9 degrees.

The lower alignment axis AA1 is disposed between the first transmission axis LA1 and the fourth directional axis DR4. The lower alignment axis AA1 forms a second acute angle θ2 with the first transmission axis LA1. The upper alignment axis AA2 is substantially parallel to the first transmission axis LA1.

FIG. 13 shows the transmittance and the diffraction efficiency of the liquid crystal lens LRP according to the second acute angle θ2. In FIG. 13, a first graph GR1 represents the transmittance, and a second graph GR2 represents the diffraction efficiency.

In an exemplary embodiment, the fourth directional axis DR4 may form the first acute angle θ1 of about 7 degrees in a counter-clockwise direction with respect to the first transmission axis LA1. In such an embodiment, the upper alignment axis AA2 is substantially parallel to the first transmission axis LA1.

When the second acute angle θ2 is about zero (0) degrees, the amount of light lost in the liquid crystal layer is minimized due to the liquid crystal layer LRP-LCL (refer to FIG. 7) that is not twist-aligned such that the liquid crystal lens LRP may have the highest transmittance. The first graph GR1 is obtained on the assumption that the transmittance of the liquid crystal lens LRP is about 100% when the second acute angle θ2 is about zero (0) degrees. However, the liquid crystal lens LRP may have the lowest diffraction efficiency when the second acute angle θ2 is about zero (0) angle.

When the second acute angle θ2 is about 7 degrees, the control efficiency of the liquid crystal layer LRP-LCL is highest when the lower electrodes 43 and 44 and the lower alignment axis AA1 extend in the same direction such that the liquid crystal lens LRP may have the highest diffraction efficiency. However, when the second acute angle θ2 is about 7 degrees, the amount of the light lost in the liquid crystal layer LRP-LCL, which is twist-aligned, increases such that the liquid crystal lens LRP may have the lowest transmittance. When the second acute angle θ2 is about 7 degrees, the liquid crystal lens LRP has the transmittance of about 98.5%.

In an exemplary embodiment, the lower alignment axis AA1 is disposed between the first transmission axis LA1 and the fourth directional axis DR4, and thus the loss of the light may be effectively prevented, and the diffraction efficiency may be effectively prevented from being lowered. The second acute angle θ2 corresponds to about 2/7 to about 5/7 of the first acute angle θ1. Therefore, when the first acute angle θ1 is about 7 degrees, the second included angle θ2 is in a range from about 2 degrees to about 5 degrees.

In one exemplary embodiment, for example, the second acute angle θ2 may be about ½ of the first acute angle θ1. Thus, in such an embodiment, when the first acute angle θ1 is about 7 degrees, the second acute angle θ2 may be about 3.5 degrees. When the second acute angle θ2 is about 3.5 degrees, the transmittance of the liquid crystal lens LRP is about 99.65%, and the diffraction efficiency has a relatively high value.

In an exemplary embodiment, the upper alignment axis AA2 may have the first transmission axis LA1 and the second acute angle θ2. The upper alignment axis AA2 may be substantially parallel to the lower alignment axis AA1. When the upper alignment axis AA2 is substantially parallel to the lower alignment axis AA1, the first graph GR1 is slightly shifted down since the upper alignment axis AA2 and the third transmission axis LA3 are twisted, and the second graph GR2 is slightly shifted up since the upper alignment axis AA2 becomes closer to the extending direction of the lower electrodes 43 and 44, that is, the acute angle between the upper alignment axis AA2 and the fourth directional axis DR4 is reduced.

Although the exemplary embodiments of the invention have been described herein, it is understood that the invention should not be limited to these exemplary embodiments but various changes and modifications can be made by one ordinary skilled in the art within the spirit and scope of the invention as hereinafter claimed.

What is claimed is:

1. A display device comprising:
    a display panel comprising a display surface defined by a first directional axis, and a second directional axis substantially perpendicular to the first directional axis;
    a first polarizer disposed on the display panel and having a first optical axis substantially parallel to the first directional axis;
    a liquid crystal lens comprising:
    a plurality of lower electrodes disposed on the first polarizer and extending in a direction substantially parallel to a third directional axis crossing the first directional axis;
    an upper electrode spaced apart from the lower electrodes; and
    a liquid crystal layer disposed between the lower electrodes and the upper electrode and aligned between a lower alignment axis and an upper alignment axis; and
    a second polarizer disposed on the liquid crystal lens and having a second optical axis substantially parallel to the first directional axis,
    wherein the lower alignment axis is defined between the first directional axis and the third directional axis on the display surface, and
    wherein a second acute angle between the first directional axis and the lower alignment axis is in a range of about 2/7 to about 5/7 of a first acute angle between the first directional axis and the third directional axis.

2. The display device of claim 1, wherein the first acute angle between the first directional axis and the third directional axis is in a range from about 5 degrees to about 9 degrees.

3. The display device of claim 2, wherein
    a second acute angle between the first directional axis and the lower alignment axis is about ½ of the first acute angle, and
    the lower alignment axis is defined on the lower electrodes.

4. The display device of claim 1, wherein
    the upper alignment axis is substantially parallel to the first directional axis, and
    the upper alignment axis is defined on the upper electrode.

5. The display device of claim 4, wherein the liquid crystal layer comprises liquid crystal molecules twist-aligned between the lower alignment axis and the upper alignment axis.

6. The display device of claim 1, wherein a third acute angle between the first directional axis and the upper alignment axis is in a range from about 2/7 to about 5/7 of the first acute angle.

7. The display device of claim 6, wherein the upper alignment axis is substantially parallel to the lower alignment axis.

8. The display device of claim 1, further comprising:
    a third polarizer disposed opposite to the first polarizer such that the display panel is disposed between the first polarizer and the third polarizer, wherein the third polarizer has a third optical axis.

9. The display device of claim 8, wherein the third optical axis is substantially perpendicular to or substantially parallel to the first optical axis.

10. The display device of claim 9, wherein
    the display panel comprises a plurality of pixel columns extending in the first directional axis and arranged in the second directional axis, and
    each of the pixel columns comprises a plurality of pixels arranged in the first directional axis.

11. The display device of claim 10, wherein each of the pixels comprises a liquid crystal capacitor.

12. A display device comprising:
    a display panel comprising a display surface defined by a first directional axis, and a second directional axis substantially perpendicular to the first directional axis;
    a first polarizer disposed on the display panel and having a first optical axis substantially parallel to the first directional axis;
    a liquid crystal lens comprising a plurality of lens units which is disposed on the first polarizer and extends in a third directional axis crossing the first directional axis, wherein the liquid crystal lens is configured to provide a multi-viewpoint image to first and second focuses different from each other in a three-dimensional mode; and
    a second polarizer disposed on the liquid crystal lens and having a second optical axis substantially parallel to the first directional axis,
    wherein each of the lens units comprises:
    a lower electrode extending substantially parallel to the third directional axis;
    an upper electrode spaced apart from the lower electrode; and
    liquid crystal molecules aligned between a lower alignment axis defined on the lower electrode and an upper alignment axis defined on the upper electrode,
    wherein the lower alignment axis is defined between the first directional axis and the third directional axis on the display surface, and
    wherein a first acute angle between the first directional axis and the lower alignment axis is in a range from about 2/7 to about 5/7 of a second acute angle between the first directional axis and the third directional axis.

13. The display device of claim 12, wherein the second acute angle is in a range from about 5 degrees to about 9 degrees.

14. The display device of claim 12, wherein the upper alignment axis is substantially parallel to the first directional axis.

15. The display device of claim 14, wherein the liquid crystal molecules are twist-aligned between the lower alignment axis and the upper alignment axis.

16. The display device of claim 12, wherein a first acute angle between the first directional axis and the lower alignment axis is about ½ of a second acute angle between the first directional axis and the third directional axis.

17. The display device of claim 12, further comprising:
a third polarizer opposite to the first polarizer such that the display panel is disposed between the first polarizer and the third polarizer, wherein the third polarizer has a third optical axis.

18. The display device of claim 17, wherein the third optical axis is substantially perpendicular to or substantially parallel to the first optical axis.

* * * * *